US011865975B2

(12) United States Patent
Hintz et al.

(10) Patent No.: US 11,865,975 B2
(45) Date of Patent: Jan. 9, 2024

(54) METHOD FOR MOUNTING AND DISMOUNTING A TELEMATICS UNIT, TELEMATICS UNIT AND MODULE OF A VEHICLE

(71) Applicant: PEIKER acustic GmbH, Friedrichsdorf (DE)

(72) Inventors: Torsten Hintz, Friedrichsdorf (DE); Walter Reichert, Friedrichsdorf (DE)

(73) Assignee: PEIKER acustic GmbH, Friedrichsdorf (DE)

( * ) Notice: Subject to any disclaimer, the term of this patent is extended or adjusted under 35 U.S.C. 154(b) by 500 days.

(21) Appl. No.: 16/644,035

(22) PCT Filed: Sep. 4, 2018

(86) PCT No.: PCT/EP2018/073778
§ 371 (c)(1),
(2) Date: Mar. 3, 2020

(87) PCT Pub. No.: WO2019/043267
PCT Pub. Date: Mar. 7, 2019

(65) Prior Publication Data
US 2020/0346588 A1   Nov. 5, 2020

(30) Foreign Application Priority Data

Sep. 4, 2017   (DE) .................... 10 2017 120 241.2

(51) Int. Cl.
*B60R 11/02*   (2006.01)
*B60R 11/00*   (2006.01)

(52) U.S. Cl.
CPC ....... *B60R 11/02* (2013.01); *B60R 2011/0028* (2013.01); *B60R 2011/0096* (2013.01); *B60R 2011/0294* (2013.01)

(58) Field of Classification Search
CPC ............ B60R 11/02; B60R 2011/0294; B60R 2011/0028; B60R 2011/0096;
(Continued)

(56) References Cited

U.S. PATENT DOCUMENTS 3,913,971 A   10/1975   Green
5,374,103 A *  12/1994  Stange .................. B60N 2/797
248/27.1

(Continued)

FOREIGN PATENT DOCUMENTS

GB   2123758 A   2/1984
JP   H08-031158 A   2/1996
(Continued)

OTHER PUBLICATIONS

International Search Report and Written Opinion corresponding to International Patent Application No. PCT/EP2018/073778, dated Dec. 20, 2018 (10 pages).

*Primary Examiner* — Christopher Garft
*Assistant Examiner* — Michael McDuffie
(74) *Attorney, Agent, or Firm* — Osha Bergman Watanabe & Burton LLP

(57) ABSTRACT

The invention relates to a method for mounting and dismounting a telematics unit (1) in relation to a vehicle body (101), the telematics unit (1) comprising a telematics box (2) and a holding frame (3), according to which the telematics box (2) is inserted into an opening of the holding frame (3), in a pre-mounting step, and locked to the holding frame (3), and for mounting from the outside, the telematics unit (1) formed from the holding frame (3) and the telematics box (2) is inserted into a recess (102) of the vehicle body (101), adapted to the holding frame (3), and locked to the vehicle body (101). For dismounting out of the interior (106) of the vehicle body (101), the telematics box (2) is unlocked from
(Continued)

Figure 1:
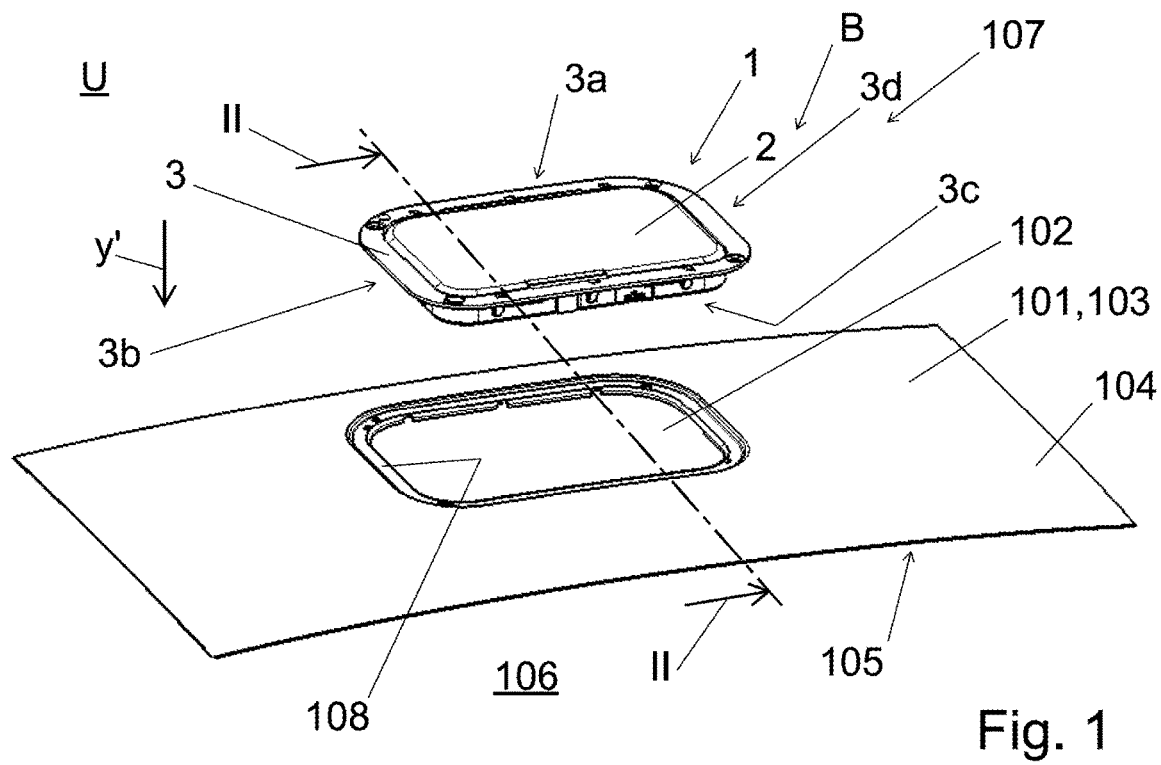

the holding frame (3) and removed from the holding frame (3) in the interior (106).

10 Claims, 4 Drawing Sheets

(58) Field of Classification Search
CPC ... B60R 11/00; B60R 13/011; B60R 13/0243; B60R 2011/0021; B60R 2011/0071; B60R 2013/016
USPC ......... 248/634, 686, 220.21, 221.11, 222.11, 248/222.12, 222.13, 222.51, 222.52, 248/223.31, 223.41, 224.51, 224.7, 27.1, 248/27.3
See application file for complete search history.

(56) References Cited

U.S. PATENT DOCUMENTS

| | | | | |
|---|---|---|---|---|
| 5,478,037 A * | 12/1995 | Haltof | ................... | F16M 13/00 |
| | | | | 248/221.11 |
| 5,823,495 A * | 10/1998 | Joss | ................... | B60R 11/0205 |
| | | | | 361/825 |
| 6,126,221 A * | 10/2000 | Kern | ........................ | B60R 7/04 |
| | | | | 296/37.7 |
| 6,370,037 B1 * | 4/2002 | Schoenfish | ......... | B60R 11/0241 |
| | | | | 361/801 |
| 6,409,242 B1 * | 6/2002 | Chang | ................. | B60R 11/0235 |
| | | | | 312/7.2 |
| 8,371,539 B2 * | 2/2013 | Hirota | .................... | G08C 17/02 |
| | | | | 292/87 |
| 8,807,488 B2 * | 8/2014 | Lee | ......................... | G06F 1/187 |
| | | | | 248/222.51 |
| 9,637,062 B2 * | 5/2017 | Tyrer | ........................ | B60R 11/02 |
| 2006/0109388 A1 * | 5/2006 | Sanders | ................ | G11B 31/006 |
| 2006/0250531 A1 * | 11/2006 | Hsu | ...................... | B60R 11/0235 |
| | | | | 348/844 |
| 2007/0019371 A1 * | 1/2007 | Yang | ................... | B60R 11/0235 |
| | | | | 361/679.22 |
| 2013/0009460 A1 * | 1/2013 | Speach | ................... | B60R 11/02 |
| | | | | 248/220.21 |
| 2014/0209648 A1 * | 7/2014 | Jahn | ......................... | B60R 11/02 |
| | | | | 224/401 |
| 2015/0028175 A1 * | 1/2015 | Larson | .................... | B60R 11/02 |
| | | | | 248/309.1 |
| 2015/0041510 A1 | 2/2015 | Frenzel et al. | | |
| 2016/0167586 A1 * | 6/2016 | Da Costa Pito | ........ | B60R 11/02 |
| | | | | 224/570 |
| 2018/0072238 A1 * | 3/2018 | Tyrer | .................. | B60R 11/0252 |
| 2018/0186301 A1 * | 7/2018 | Vander Sluis | .......... | B60R 11/02 |

FOREIGN PATENT DOCUMENTS

| | | |
|---|---|---|
| JP | 2008-162486 A | 7/2008 |
| JP | 2015-508728 A | 3/2015 |
| WO | 2013127388 A1 | 9/2013 |

* cited by examiner

METHOD FOR MOUNTING AND DISMOUNTING A TELEMATICS UNIT, TELEMATICS UNIT AND MODULE OF A VEHICLE

The invention relates to a method for mounting and dismounting a telematics unit, a telematics unit and a module of a vehicle.

GB 2 123 758 A discloses an insert for a vehicle roof, which fits into a cut-out for a sunroof.

The invention is based on the object of developing a method for mounting and dismounting a telematics unit and a telematics unit and a module of a vehicle, by means of which a mounting and dismounting process on a vehicle body is made easier and the risk of theft is reduced.

The inventive method for mounting and dismounting a telematics unit on a vehicle body, in particular a vehicle roof, provides the steps named below:

to produce the telematics unit, which comprises a telematics box and a holding frame, the telematics box is inserted into an opening of the holding frame in a pre-mounting step, and locked to the holding frame, for mounting from the outside, the telematics unit formed from the holding frame and the telematics box is inserted into a cut-out in the vehicle body that is matched to the holding frame, and is locked to the vehicle body, for dismounting from an interior of the vehicle body, the telematics box is unlocked from the holding frame and removed from the holding frame into the interior. Despite a subsequent ability to dismount the telematics box from an interior of the vehicle, mounting of the telematics unit from outside is possible. In this way, the mounting is made easier, since this can be carried out exclusively from the outside without any regard having to be paid to the restricted space in an interior of the vehicle. Furthermore, the dismounting is also made easier, since, in the event of service, this can be carried out from the interior, so that this can be carried out at a location at which access can also be made to the cable guidance, so that having to have the worker work on the vehicle body from the inside and from the outside is avoided. Accordingly, theft is also prevented in this way, since separating the telematics box from the holding frame is possible only in such a way that the telematics box is removed into the interior of the vehicle.

Provision is also made for the holding frame of the telematics unit to be locked to the vehicle body in such a way that said holding frame can be separated from the vehicle body again only by means of a tool. In particular, connecting the holding frame to the vehicle body by means of snap-in hooks and expanding rivets is provided. In this way, the holding frame is connected to the vehicle body in a theft-proof manner.

Provision is also made for the dismounting of the telematics box to be carried out in such a way that the locking of the telematics box to the holding frame is firstly released by hand and without any tools, wherein a force vector of a force exerted for the unlocking is oriented parallel to a plane defined by the vehicle body in the area of the cut-out, wherein the telematics box is in particular unlocked by a sliding movement or by a folding movement. In this way, during dismounting, damage to the vehicle body and in particular the vehicle roof is avoided, since it is not necessary for the dismounting to apply any transverse forces, as a result of which there is a danger that the vehicle body is bent and experiences permanently visible damage. In addition, renewed mounting of the telematics box can be carried out from the inside without there being any danger of damaging the vehicle body as a result of the exertion of a force required for the mounting.

Provision is also made that, following the unlocking, the telematics box is firstly tilted with respect to the holding frame in such a way that during the tilting movement, the telematics box remains in contact with the holding frame with an edge located opposite an unlocking means. In this way, unlocking performed on one side is sufficient to remove the telematics box into the interior of the vehicle. This makes the unlocking process considerably easier for the worker and also makes it possible to perform the unlocking and the removal with one hand.

The telematics unit according to the invention, which comprises a telematics box for the accommodation and for the connection of components for the communication and data link of a vehicle, also comprises a holding frame besides the telematics box, wherein the holding frame comprises an opening, wherein the telematics box and the holding frame are matched to each other in such a way that, in the mounted state, the telematics box is accommodated in the opening and locked to the holding frame, so that the telematics box is carried by the holding frame and is removable by unlocking. Such a unit, designated as a telematics unit, makes it possible to connect the telematics box and the holding frame to the vehicle body in one mounting step and to insert the same into a cut-out formed in the vehicle body.

Furthermore, provision is made to form the holding frame as a circumferentially closed holding frame. By means of such a holding frame, a durable and secure connection between the holding frame and the vehicle body and also between the holding frame and the telematics box can be produced.

Provision is also made for the holding frame to comprise at least two coupling means for its opening, for the telematics box to comprise at least two mating coupling means between an upper side and an underside, wherein, in the mounted state, the telematics box sits in the opening of the holding frame in such a way that the individual coupling means and the individual mating coupling means form coupling pairs, by means of which the telematics box is captively fixed in the holding frame. In this way, a reliable mounting of the telematics box in the holding frame is ensured and at the same time the precondition is created that the telematics box can be detached from the holding frame with one simple action.

Provision is also made for the holding frame to comprise at least two clamping means on an outer side pointing away from its opening, wherein, in the mounted state, the holding frame is fixed by a form fit in a cut-out of a vehicle body. Here, the clamping means are preferably formed as snap-in hooks and/or expanding rivets. As a result of such a fixing of the holding frame, the latter can be mounted easily and quickly by pressing in. Furthermore, in this way, given an appropriate design and arrangement of the clamping means, dismounting the holding frame from outside is made more difficult or impossible, so that theft is also prevented.

Furthermore, provision is made for the telematics box to comprise at least one unlocking means, wherein, by means of the unlocking means, by means of a linear movement or a pivoting movement, one of the coupling means or one of the mating coupling means can be moved in such a way that a connection formed by one of the coupling pairs is released. In this way, it is possible for a worker to unlock and dismount the telematics box quickly and gently from the holding frame from the interior of the vehicle.

Provision is also made for the unlocking means to be formed by one of the mating coupling means or by one of the coupling means, and for the unlocking means to be formed in particular as a lever, wherein the lever is preferably pivotable about a pivot axis. In this way it is possible for a worker to unlock and dismount the telematics box quickly and gently from the holding frame from the interior of the vehicle.

Alternatively, provision is also made for the unlocking means to be formed as an actuating means, in particular a lever, by means of which the mating coupling means or the coupling means can be moved, and for the actuating means in particular to be pivotable about a pivot axis. In this way, it is possible for a worker to unlock and dismount the telematics box quickly and gently from the holding frame from the interior of the vehicle.

In the inventive module of a vehicle, which comprises a vehicle body having a cut-out and a telematics box, provision is made for the module to comprise a holding frame, for the holding frame to be matched to the cut-out in the vehicle body in such a way that the holding frame is accommodated in the cut-out in the mounted state and is locked to the vehicle body, so that the holding frame is carried by the vehicle body and for the holding frame and the telematics box to be matched to each other in such a way that the telematics box is accommodated in an opening of the holding frame in the mounted state and is detachably locked to the holding frame, so that the telematics box is carried by the holding frame and can be removed from the holding frame by unlocking. By means of such a module, the mounting is made easier, since it can be carried out exclusively from the outside without any regard having to be paid to the restricted space in an interior of the vehicle. Furthermore, the dismounting is also made easier, since, in the event of service, this can be carried out from the interior, so that this can be carried out at a location at which access can also be made to the cable guidance, so that having to have the worker work from the inside and from the outside is avoided. Accordingly, theft is also prevented in this way, since separating the telematics box from the holding frame is possible only in such a way that the telematics box is removed into the interior of the vehicle.

In the sense of the invention, a telematics box is understood to mean a structural unit which combines components of communications technology and information technology in itself and which can be connected in a wired and/or wire-free manner to further components of communications technology and information technology such as optionally, for example, active antennas and/or passive antennas and/or amplifiers and/or terminals.

Further details of the invention will be described in the drawings by using schematically illustrated exemplary embodiments.

Figure 2:
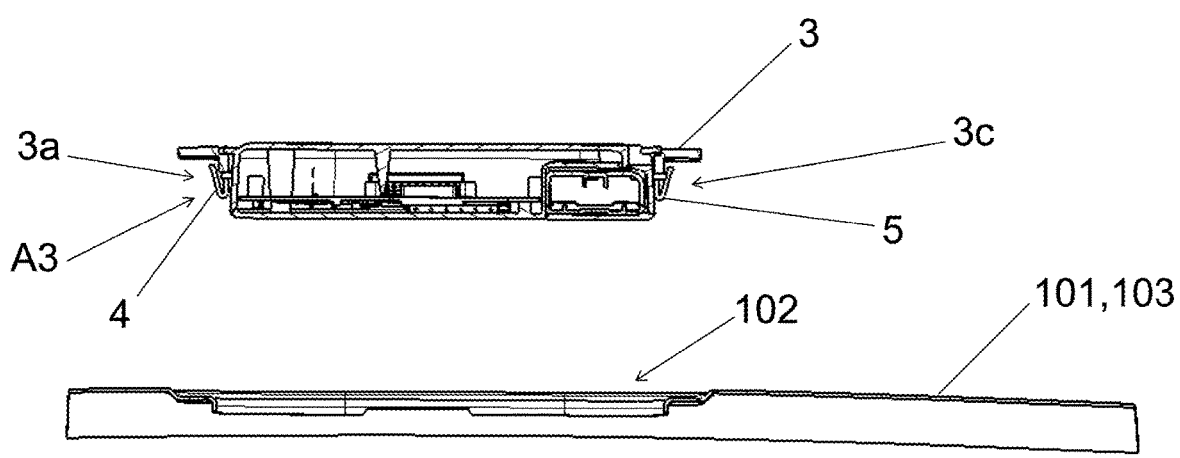
Figure 3:
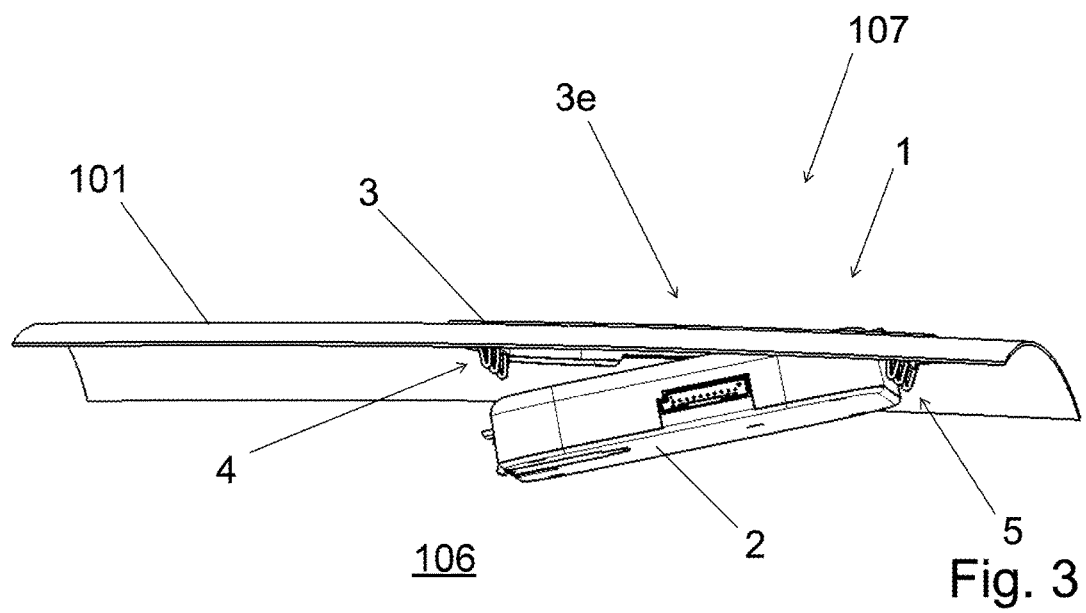
Figure 4:
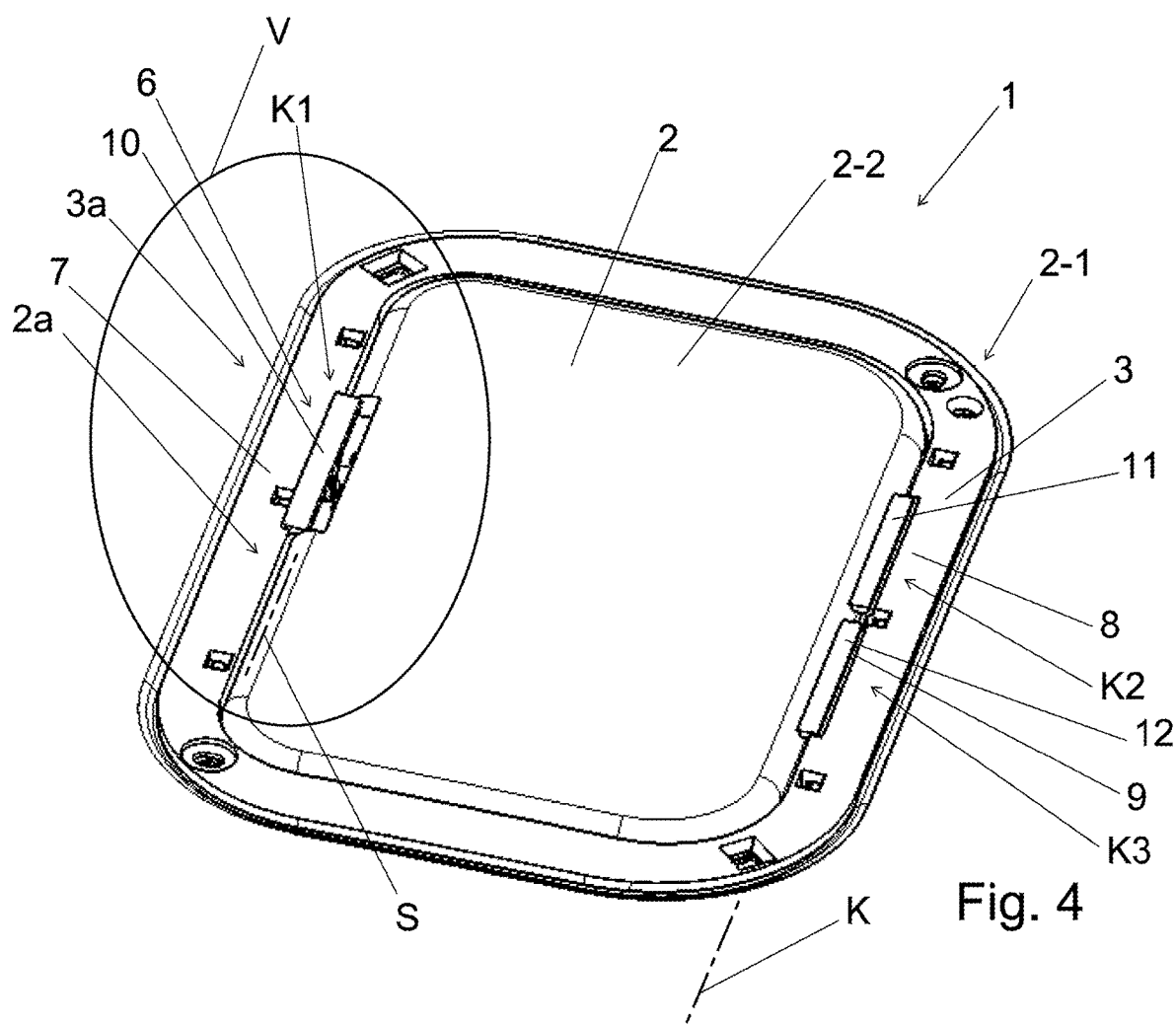
Figure 5:
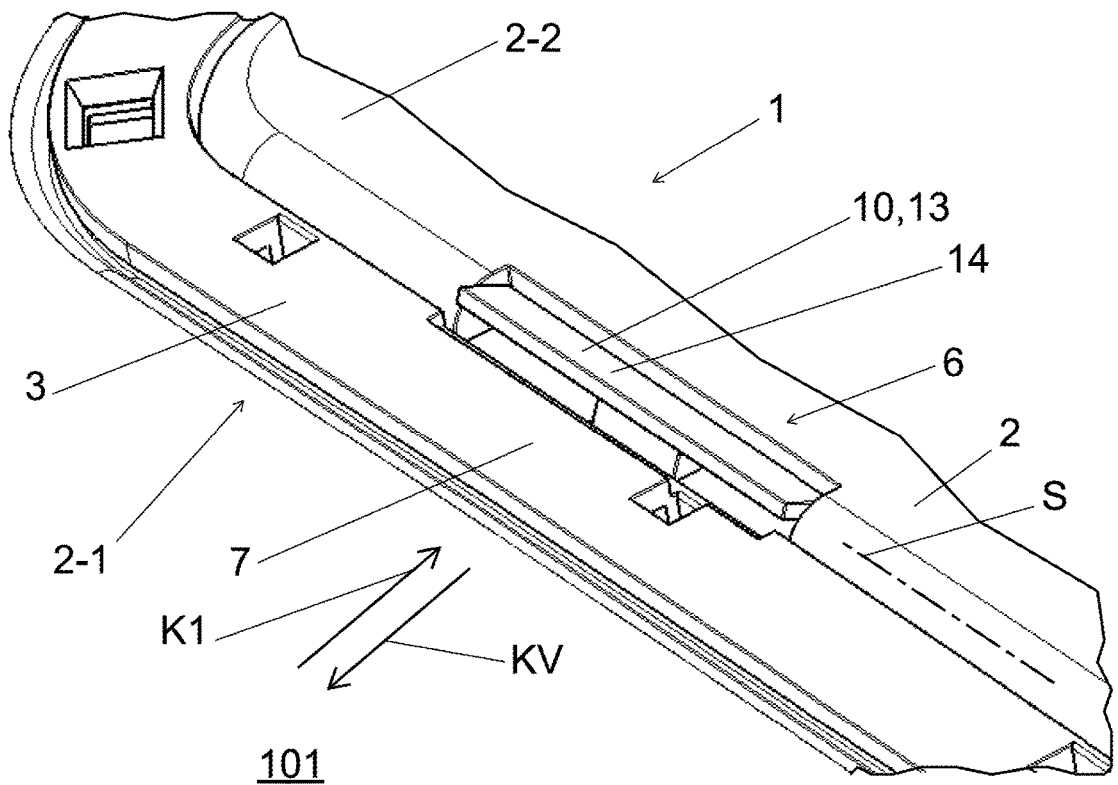
Figure 6:
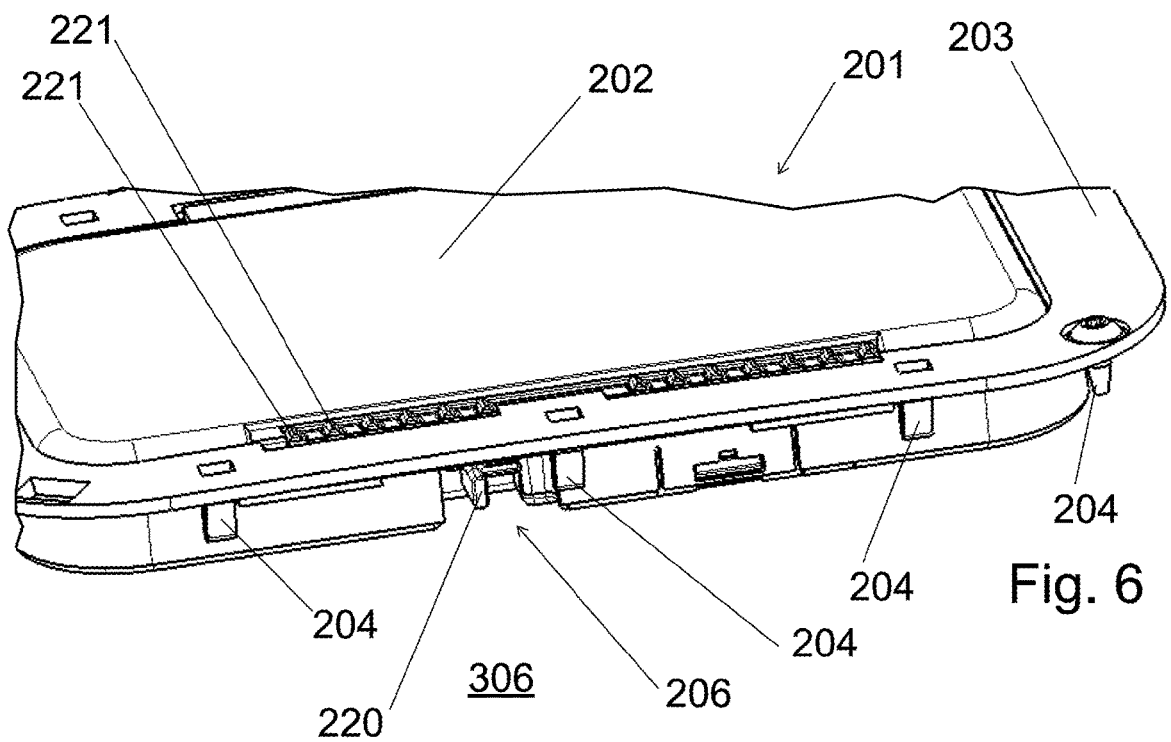
Figure 7:
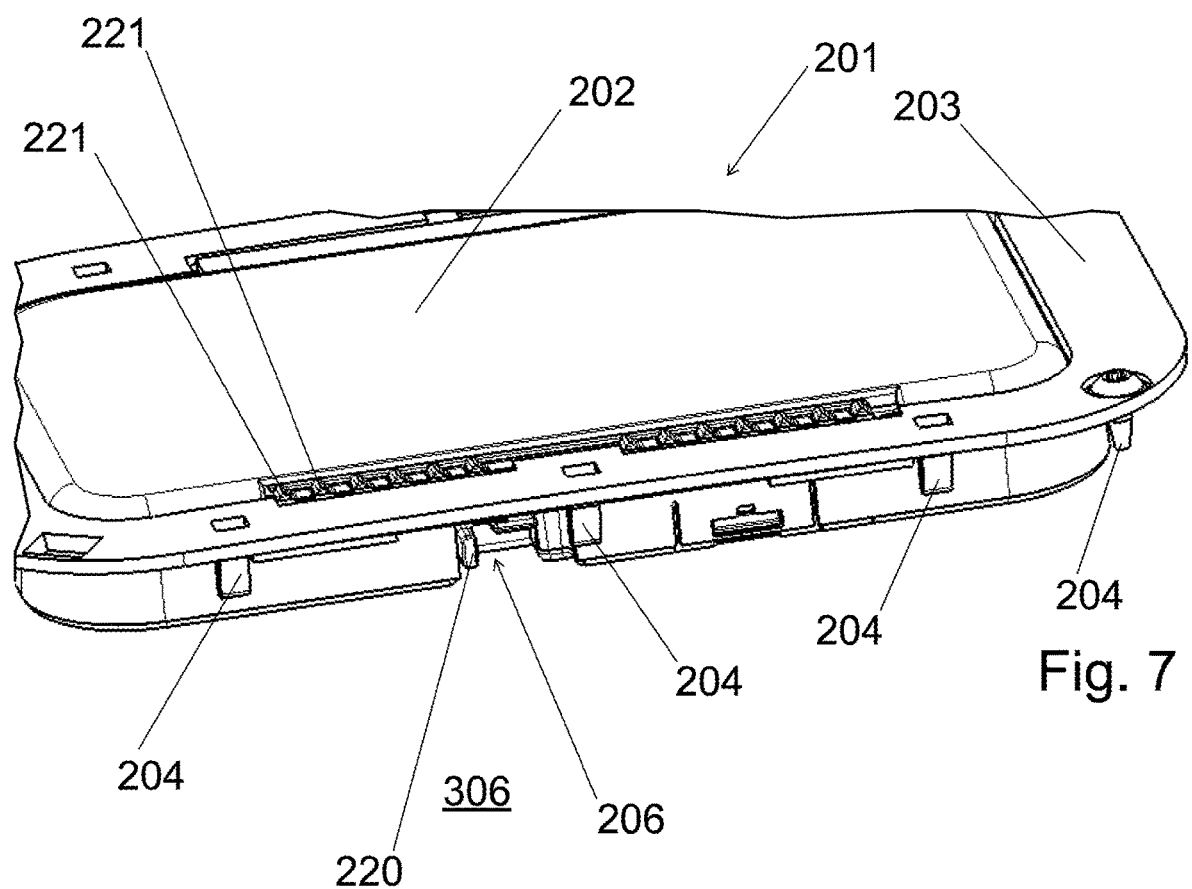

In the drawings:

FIG. 1: shows a perspective view of a vehicle body and a telematics unit;

FIG. 2: shows a cross section through the illustration of FIG. 1 according to the section line II-II;

FIG. 3: shows a perspective view of the telematics unit mounted in the vehicle body, wherein the telematics box is already shown during the dismounting process;

FIG. 4: shows a bottom view of the telematics unit;

FIG. 5: shows a detailed view relating to FIG. 4;

FIG. 6: shows a perspective view of a second telematics unit in a closed position of a sliding lock, and FIG. 7 shows a further perspective view of the second telematics unit, wherein the sliding lock is in an open position.

FIG. 1 shows a perspective view of a vehicle body 101 and a telematics unit 1. The vehicle body 101 comprises a cut-out 102, into which the telematics unit 1 can be inserted, wherein the vehicle body 101 is formed as a vehicle roof 103. In the perspective view, an outer side 104 of the vehicle body 101 or the vehicle roof 103 is visible. An underside 105 of the vehicle body 101 or the vehicle roof 103 is opposite the outer side 104 and points toward an interior 106, not specifically shown, of a vehicle 107, not specifically shown, to which the vehicle body 101 belongs.

The telematics unit 1 is provided to be inserted into the cut-out 102 in a direction of the arrow y' from an environment U surrounding the vehicle 107. The telematics unit 1 comprises a telematics box 2 and a holding frame 3, wherein the holding frame 3 surrounds the telematics box 2 in the manner of a ring. The telematics box 2 is fixed in the holding frame 3, so that, during handling of the holding frame 3, said telematics box maintains its alignment relative to the holding frame 3.

FIG. 2 shows the illustration of FIG. 1 in a section according to the section line II-II. In this view, it can be seen that the holding frame 3 comprises clamping means 4, 5 on opposite transverse sides 3a, 3c (see also FIG. 1), which, as the telematics unit 1 is pressed into the cut-out 102 of the vehicle body 101, lock with a web 108 running around the cut-out 102 (see FIG. 1), so that the telematics unit 1 is fixed to the vehicle body 101 and can be detached from the latter only if the clamping means 4, 5 are actuated by means of a tool. Here—in order to prevent undesired dismounting—provision is made that the clamping means 4, 5 can be actuated only from the interior 106 of the vehicle 107. The transverse sides 3a, 3c and longitudinal sides 3b, 3d (see FIG. 1) form a circumferential outer side A3 of the holding frame 3 which points away from an opening 3e of the holding frame 3 (see FIG. 3), the telematics box 2 being accommodated in the opening 3e.

The assembly of the telematics box 2 and the holding frame 3 is carried out in a pre-mounting step, so that in the mounting step shown, only the telematics unit 1 has to be installed as a unit.

FIG. 3 shows how the telematics unit 1 is fixed in the vehicle body 101 in a further perspective view, wherein in this illustration it has also already been shown how the telematics box 2 is already partly unlocked from the holding frame 3 and has been pivoted into the interior 106 of the vehicle 107 for complete dismounting.

FIG. 4 shows a bottom view of the telematics unit 1, wherein the telematics unit appears here to be square because of the selected perspective. For simplification, illustration of the vehicle body and of the clamping means has been omitted. Arranged on a transverse side 2a of the telematics unit 2 that extends parallel to the transverse side 3a of the holding frame 3 is a lock 6. This lock 6 is illustrated as closed in FIG. 4.

In FIG. 5, which shows an enlarged view of a detail V of the telematics box 1, the lock 6 is illustrated as open. In order to form the lock 6, the holding frame 3 comprises coupling means 7, 8 and 9 (see also FIG. 4) and encloses the telematics box 2 between an upper side 2-1 and an underside 2-2 of mating coupling means 10, 11 and 12 (see also FIG. 4). The coupling means 7, 8, 9 and the mating coupling means 10, 11, 12 form coupling pairs K1, K2, K3. The mating coupling means 10 is formed as an unlocking means 13 and forms a lever 14, which is pivotable about a pivot axis S and is unlocked when pivoted by the coupling means 7, so that, as shown in FIG. 3, the telematics box 2 can be folded downward about a folding axis K (see FIG. 4) formed by the coupling means 8, 9 and the mating coupling means 11, 12 into the interior 106 of the vehicle 107, in order then to be able to be taken off the coupling means 8, 9. From the interior 106 of the vehicle 107, the telematics box 2 can be fixed in the holding frame 3 again in a manner reversed relative to the preceding description. A force vector KV of a force generated while pivoting the lever 14 about the pivot axis S is oriented parallel to a plane defined by the vehicle body 101 in the region of the cut-out.

The telematics box 2, the holding frame 3 and the vehicle body 101 form a module B of the vehicle 107 (see FIG. 1).

FIG. 6 illustrates a perspective view of a second telematics unit 201. The telematics unit 201 likewise comprises a telematics box 202 which is accommodated in a holding frame 203, wherein a vehicle body, on which the holding frame 203 is fixed, is not illustrated. On the holding frame 203 it is possible to see clamping means 204, which are formed as snap-in hooks or expanding rivets and are used for the fixing to the vehicle body, not illustrated.

From an interior 306, it is possible to see a lock 206, which can be actuated by a slider 220. The lock 206 comprises teeth 221, designated by way of example, which are displaced by the slider 220 by sliding the slider 220 to the left from a closed position, shown in FIG. 6, into an open position shown in FIG. 7. Here, in the position shown in FIG. 6, the teeth 221 guided on the telematics box 202 engage in the holding frame 203 in such a way that the telematics box 202 is fixed to the holding frame 203, wherein the telematics box 202 opposite to the lock 206 is connected to the holding frame 203 in a manner analogous to the first design variant, so that said telematics box 202 can be pivoted downward into the interior 306 from the open position shown in FIG. 7 and can be taken off.

LIST OF DESIGNATIONS

1 Telematics unit
2 Telematics box
2a Transverse side of 2
2-1 Upper side of 2
2-2 Underside of 2
3 Holding frame
3a, 3c Transverse side of 3
3b, 3d Longitudinal side of 3
3e Opening of 3 to accommodate 2
4, 5 Clamping means of 3
6 Lock of 2 on 3
7, 8, 9 Coupling means
10, 11, 12 Mating coupling means
13 Unlocking means
14 Lever
A3 Outer side of 3
B Module
K Folding axis
K1-K3 Coupling pairs
KV Force vector
S Pivot axis of 14
U Environment
y' Arrow direction
101 Vehicle body
102 Cut-out
103 Vehicle roof
104 Outer side
105 Underside
106 Interior
107 Vehicle
201 Telematics unit
202 Telematics box
203 Holding frame
206 Lock
220 Slider
221 Tooth
306 Interior

The invention claimed is:

1. A method for mounting and dismounting a telematics unit on a vehicle body,
   wherein the telematics unit comprises a telematics box and a holding frame,
   wherein the telematics box comprises an individual mating coupling means, and
   wherein the holding frame comprises an individual coupling means,
   the method comprising:
   inserting the telematics box into an opening of the holding frame in a pre-mounting step, and locking the telematics box to the holding frame;
   for mounting from an outside, inserting the telematics unit formed from the holding frame and the telematics box into a cut-out of the vehicle body that is matched to the holding frame, wherein the telematics unit is locked to the vehicle body; and
   for dismounting from an interior of the vehicle body, unlocking the telematics box from the holding frame by an unlocking means formed by the individual mating coupling means and the individual coupling means with a pivoting movement of a lever and removing the telematics box from the holding frame into the interior.

2. The method as claimed in claim 1, wherein the holding frame of the telematics unit is locked to the vehicle body so that said holding frame can be separated from the vehicle body again only by a tool.

3. The method as claimed in claim 1, wherein the dismounting of the telematics box is carried out so that unlocking of the telematics box to the holding frame is firstly released by hand and without any tools, wherein a force vector of force exerted for the unlocking is oriented parallel to a plane defined by the vehicle body in an area of the cut-out, wherein the telematics box is unlocked by a sliding movement or by a folding movement.

4. The method as claimed in claim 3, wherein following the unlocking, the telematics box is firstly tilted with respect to the holding frame so that during a tilting movement, the telematics box remains in contact with the holding frame with an edge located opposite the unlocking means.

5. A telematics unit comprising:
   a telematics box for accommodation and for connection of components for the communication and data link of a vehicle;
   and a holding frame, wherein the holding frame comprises an opening,
   wherein the telematics box and the holding frame are matched to each other in such a way that, in a mounted state, the telematics box is accommodated in the opening and locked to the holding frame, so that the telematics box is carried by the holding frame and is removable by unlocking,
   wherein the holding frame comprises at least two coupling means for the opening,
   wherein the telematics box comprises at least two mating coupling means between an upper side and an underside, wherein, in the mounted state, the telematics box sits in the opening of the holding frame in such a way that individual coupling means and individual mating coupling means form coupling pairs, by which the telematics box is captively fixed in the holding frame, wherein the telematics box further comprises at least one unlocking means formed by the individual mating coupling means and the individual coupling means, wherein, by the unlocking means, with a pivoting movement of a lever, the individual coupling means or the individual mating coupling means is moved so that a connection formed by one of the coupling pairs is released to remove the telematics box from the holding frame.

6. The telematics unit as claimed in claim 5, wherein the holding frame is formed as a circumferentially closed holding frame.

7. The telematics unit as claimed in claim 6, wherein the holding frame comprises at least two clamping means on an outer side pointing away from its opening, wherein, in the mounted state, the holding frame is fixed by a form fit in a cut-out of a vehicle body.

8. The telematics unit as claimed in claim 5, wherein the unlocking means is formed as the lever.

9. The telematics unit as claimed in claim 5, wherein the unlocking means is formed as an actuating means comprising the lever and wherein the actuating means is pivotable about a pivot axis.

10. A module of a vehicle, wherein the module comprises:
a vehicle body having a cut-out;
a telematics box; and
a holding frame, wherein the holding frame is matched to the cut-out in the vehicle body in such a way that the holding frame is accommodated in the cut-out in a mounted state and is locked to the vehicle body, so that the holding frame is carried by the vehicle body, and wherein the holding frame and the telematics box are matched to each other in such a way that the telematics box is accommodated in an opening of the holding frame in the mounted state and is detachably locked to the holding frame, so that the telematics box is carried by the holding frame and is configured to be removed from the holding frame by unlocking, wherein the holding frame comprises at least two coupling means for the opening, wherein the telematics box comprises at least two mating coupling means between an upper side and an underside, wherein, in the mounted state, the telematics box sits in the opening of the holding frame in such a way that individual coupling means and individual mating coupling means form coupling pairs, by which the telematics box is captively fixed in the holding frame, wherein the telematics box further comprises at least one unlocking means formed by the individual mating coupling means and the individual coupling means, wherein, by the unlocking means, with a pivoting movement of a lever, the individual coupling means or the individual mating coupling means is moved so that a connection formed by one of the coupling pairs is released to remove the telematics box from the holding frame.

* * * * *